United States Patent [19]
Shoji

[11] Patent Number: 5,833,418
[45] Date of Patent: Nov. 10, 1998

[54] STUD HAVING A SPHERICAL SURFACE BEARING

[75] Inventor: Akira Shoji, Nagano-ken, Japan

[73] Assignee: Minebea Co., Ltd., Nagano, Japan

[21] Appl. No.: 888,326

[22] Filed: Jul. 3, 1997

[30] Foreign Application Priority Data

Aug. 12, 1996 [JP] Japan .................................. 8-212356

[51] Int. Cl.⁶ .............................. F16B 23/00; F16B 35/06
[52] U.S. Cl. ......................... 411/396; 411/373; 411/380; 411/412
[58] Field of Search .................................. 411/107, 380, 411/381, 382, 396, 412, 413, 373

[56] References Cited

U.S. PATENT DOCUMENTS

| | | | |
|---|---|---|---|
| 1,400,736 | 12/1921 | Flannery et al. | 411/380 |
| 1,403,744 | 1/1922 | Dodds | 411/380 |
| 1,498,019 | 6/1924 | Dodds | 411/380 |
| 1,660,960 | 2/1928 | Greenslade | 411/380 |
| 2,453,724 | 11/1948 | Bowen et al. | |
| 2,928,686 | 3/1960 | Newkirk . | |
| 3,059,948 | 10/1962 | Thompson et al. | |
| 3,535,976 | 10/1970 | Osuga . | |

FOREIGN PATENT DOCUMENTS 2 004 321   3/1979   United Kingdom .

*Primary Examiner*—Neill R. Wilson
*Attorney, Agent, or Firm*—Oliff & Berridge, PLC

[57] ABSTRACT

To make it easy to manufacture a stud 1 provided with a spherical surface bearing, a race (3) is composed of a first member (3a) and a second member (3b) so that a ball receiving portion (301) is separated. Coupling surfaces (5) and (6) that couple with each other are formed in the first and second members (3a) and (3b). Screw portions are formed on the coupling surfaces (5) and (6), respectively. When the stud (1) provided with the spherical surface bearing is manufactured, a ball (2a) is held by the first and second members formed indivisually, and the first and second members (3a) and (3b) are threadably engaged with each other at the screw portions. In this case, by adjusting an amount of a engagement at the screw portion, the positional relationship between the first and second members (3a) and (3b) is set as desired, to thereby suitably adjust a gap between the ball receiving portion (301) of the race (3) and the ball (2a). The positional relationship between the first and second members (3a) and (3b) is fixed by a pin (4) to thereby eliminate the gap change.

4 Claims, 1 Drawing Sheet

STUD HAVING A SPHERICAL SURFACE BEARING

BACKGROUND OF THE INVENTION

1. Field of the Invention

The present invention relates to a stud having a spherical surface bearing for allowing two members, fixed to each other, to angularly move relative to each other.

2. Description of the Related Art

When two members are to be fixed to each other, in some cases, it is preferable to allow one member to move relative to the other by a constant amount of movement. For instance, when a window glass is fixed to a building or the like, in order to enhance a wind pressure resistance, a seismic resistance or the like, the window glass is fixed so as to allow a constant amount of the window glass movement. In this case, a stud provided at one end with a spherical surface bearing is used for fixing the respective members so as to be movable to each other by the spherical surface bearing. FIG. 2 shows the stud 1 provided with the spherical surface bearing. The stud 1 provided with the spherical surface bearing is composed of a stud rod 2 provided with one end with a ball 2a and a race 3, wherein the ball 2a is supported by the race 3 at the spherical surface bearing. In this case, the race 3 holds the ball 2a by a ball receiving portion 301 so that the ball 2a may be prevented from falling off from the race 3 and may be swung. Also, the ball receiving portion 301 is opened to the outside through a conical wall surface 302 having a predetermined angle θ relative to an axis C of the race 3. The stud rod 2 projects to the outside of the race 3 from the conical wall surface 302. Accordingly, the stud rod 2 is held swivellable within the range of the angle θ relative to the axis C of the race 3 about a center of the ball 2a.

By the way, upon manufacturing the stud having the above described structure, the conventional technology suffers from the following problems. As described above, the ball receiving portion 301 of the race 3 has a necessity to prevent by itself the ball 2a from falling off by itself and to hold the ball 2a for allowing the swing movement of the ball 2a. Accordingly, a continuous portion 303 between the ball receiving portion 301 and the conical wall surface 302 constitute an "under-cut".

Conventionally, the race 3 has been formed into an integral part by plastic deformation. In this process, in the first place, the ball 2a is inserted into a material for the race 3 which substantially forms a cylinder. Then, a pressure is applied to the material from the outside to firmly fasten the ball 2a. As a result, the shape of the ball 2a is transferred to the material. In this case, when the shape of the ball 2a is transferred to the material, it is necessary to form the ball receiving portion 301 and the continuous portion 303. For this reason, upon the completion of the plastic deformation, there is a tendency that the force of the race 3 for holding the ball 2a is excessive, so that the swing motion of the ball 2a has been impossible. Accordingly, it is necessary to slightly increase a diameter of the ball receiving portion 301 as a post-step so as to form a gap such that the ball 2a may be swivelled relative to the ball receiving portion 301. However, regarding the post-step, almost all the steps have depended upon the experience and sense of the workers. Therefore, it has been very difficult to apply it to the work easily. Also, in order to facilitate the deformation of the material for the race 3, a setting of the thickness of the race is limited, and in addition, a pressure applied to the ball 2a (a pressure such that the ball 2a is deformed) should not be excessive. To meet these requirements, a pressure applied to the race 3 has been restricted, as a result, it is difficult to determine the shape of the race as desired.

Accordingly, there has been an approach to first form divided members of the race 3 (for example, ones divided along the line A—A of FIG. 2) and to weld the two members together after holding the balls by the divided members. However, also in this method, it has been difficult to optimally set the gap between the ball 2a and the ball receiving portion 301 after welding. It is thus difficult to finely adjust the gap after welding.

SUMMARY OF THE INVENTION

In view of the foregoing problems, an object of the present invention is to provide a stud which can be manufactured at low cost and used in a wide field of application to thereby enhance a commercial value of the stud having a spherical surface bearing by facilitating the adjustment of a gap between a ball of a stud and a ball receiving portion of a race without any limit to a thickness, a shape or the like.

A means to solve the above defect in the present invention, in a stud having a spherical surface bearing, provided at one end with a ball held by a race, is characterized in that a ball receiving portion of the race is composed of two members so that may be separated, in which each of said two members having a coupling surface which is coupled with the other, and screw portions are formed on each coupling surface.

In this arrangement, the race is composed of two members. When each member is disassembled, the ball receiving portion may be separated. Also, each member has the coupling surface that couples with the other. The screw portions are formed on the respective coupling surfaces. When the stud is manufactured, the ball of the stud is held by the respective ball receiving portions formed independently with each other. The two members are fixed to each other by the screw portions penetrating the coupling surfaces of the respective members. In this case, by adjusting an amount of the engagement at the screw portions, the positional relationship between the two members may be set as desired. Accordingly, it is possible to set a gap between the ball receiving portion of the race and the ball as desired. By the way, the adjustment of the gap between the ball receiving portion of the race and the ball is performed not by deforming the race but by adjusting the amount of the engagement at the screw portions.

Also, preferably, the stud may further comprise a fixing means for fixing a positional relationship between the coupling surfaces. By the fixing means, it is possible to position the two members constituting the race. Additionally, the respective members formed by dividing a single member may be firmly fixed to each other as a single race.

DESCRIPTION OF THE PREFERRED EMBODIMENTS

Figure 1:
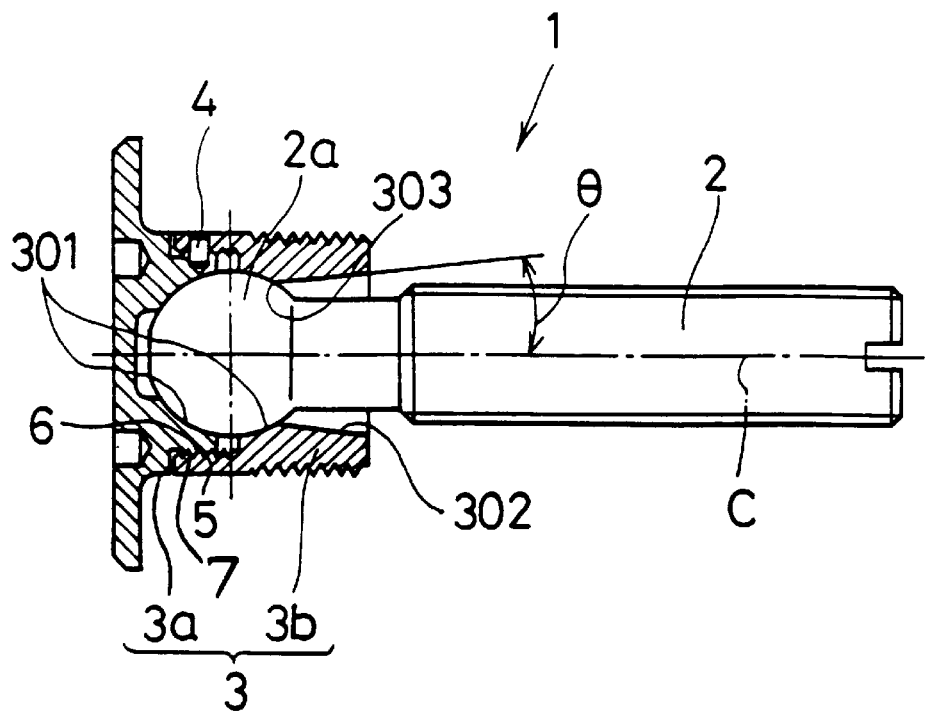
FIG. 1 is a schematic longitudinal sectional view showing a stud provided with a spherical surface bearing according to an embodiment of the present invention.
Figure 2:
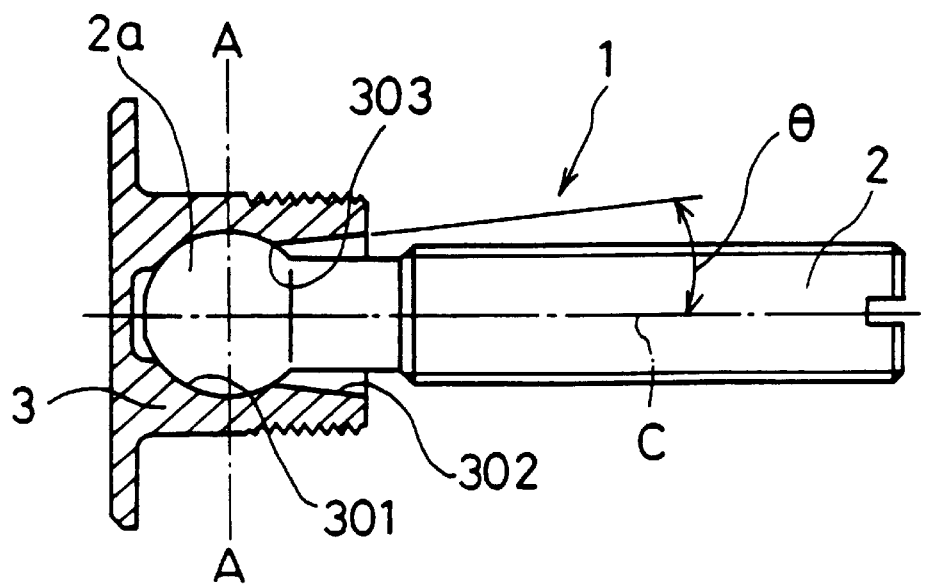
FIG. 2 is a schematic longitudinal sectional view showing a conventional stud provided with a spherical surface bearing.

The present invention will now be described with reference to FIG. 1. Incidentally, in FIG. 1, the same reference numerals are used to indicate the same members or parts that have been explained in conjunction with the conventional technique.

FIG. 1 shows a stud 1 provided with a spherical surface bearing in accordance with an embodiment of the present invention. The stud 1 is composed of a stud rod 2 provided at one end with a ball 2a and a race 3 for holding the ball 2a. Furthermore, the race 3 is composed of a first member 3a and a second member 3b for separating from each other. Ball receiving portions 301 may be separated. The second member 3b has the ball receiving portion 301 and a conical wall surface 302 having a predetermined angle θ Then, the continuous portion 303 between ball receiving portion 301 and the conical wall surface 302 constitute the under-cut.

By the way, coupling surfaces 5 and 6 of a first members 3a and a second member 3b are parallel to each other. Screw portions are formed in the coupling surfaces 5 and 6, respectively. The first member 3a and the second member 3b are made integrally with each other by the connection of the screw portions. Also, a pin 4 is used to pass through the coupling surfaces 5 and 6 of the first and the second members 3a and 3b.

Now, a manufacturing process of the stud 1 provided with the spherical surface bearing according to the embodiment of the invention will be explained. The stud rod 2 provided at one end with the ball 2a is the same as the conventional one. With respect to the race 3, the first member 3a and the second member 3b are formed independently with each other. In this process, the first member 3a and the second member 3b are formed in such a way that a further forming precess is not necessary to be applied as the following steps, because, by merely integrating the both members, the configuration of the race 3 is formed.

Subsequently, in the assembly steps for respective members, first of all, the ball 2a of the stud rod 2 is brought into contact with the ball receiving portion 301 of the first member 3a. Next, the second member 3b is inserted into the stud rod 2. The ball receiving portion 301 of the second member 3b is moved to a position to substantially come in contact with the ball 2a. Then, the screw portion formed on the coupling surface 5 of the first member 3a and the screw portion formed on the coupling surface 6 of the second member 3b are threadably engaged with each other so that the ball 2a is clamped by the respective ball receiving portions 301 of both members. In this case, by adjusting the amount of the engagement at the screw portions, the positional relationship between the first and second members 3a and 3b is set as desired. According to this, a suitable gap is formed so that the ball 2a and the ball receiving portion 301 may be swivelled relative to each other without any displacement.

Also, when the desired amount of the engagement at the screw portions has been set, a pin 4 as a fixing means (also called locking means) is press-fitted so as to penetrate the coupling surfaces 5 and 6 of the first and second members 3a and 3b to complete the stud forming process. By inserting the pin like the above, the positional relationship between the coupling surfaces 5 and 6 is fixed and it is possible to prevent an occurrence of any change of the gap between the ball receiving portion 301 and the ball 2a and to prevent the disassembling of the first member 3a and the second member 3b.

In the stud 1 provided with the spherical surface bearing manufactured in the above-described way according to the present embodiment, the ball receiving portion 301 of the race 3 is opened to the outside through a conical wall surface 302 having a predetermined angle θ, and the stud rod 2 is projected to the outside of the race 3 from the conical wall surface 302. Accordingly, the stud rod 2 is made swivellable within the range of the angle θ relative to the axis C of the race 3 about a center of the ball 2a.

The function and effect obtained from the present embodiment of the above structure is as follows. The race 3 is composed of the first and second members 3a and 3b so that the ball receiving portion 301 can be separated. Then, the screw portions are formed on the coupling surfaces 5 and 6 of the first and second members 3a and 3b, so that the positional relationship between the first and second members 3a and 3b can be set as desired by adjusting an amount of the engagement at the screw portions. Therefore, in the ball receiving portion 301 of the race 3, the gap between the ball 2a and the ball receiving portion 301 can be adjusted readily so that the ball 2a may be prevented from falling off from the race 3 and also the ball 2a can be held angularly movable.

Further, a pin 4 as a fixing means is press-fitted so as to penetrate the coupling surfaces 5 and 6 of the first and second members 3a and 3b to thereby fix the positional relationship between the coupling surfaces 5 and 6. According to the above, it is therefore possible to prevent an occurrence of any change at the gap between the ball receiving portion 301 and the ball 2a and to prevent the disassembling of the first member 3a and the second member 3b. Also, it is possible to fix the both surfaces by using a screw or an adhesive 7 or the like instead of the pin 4 as the fixing means. One skilled in the art would know how to apply an adhesive 7 to coupling surfaces 5 and 6.

Further, when the first member 3a and the second member 3b are formed independently with each other, the first member 3a and the second member 3b are formed in such a way that a further forming process is not necessary to be applied as the following step, because, by merely integrating the both members, the configuration of the race 3 is formed. Since the respective members are formed independently with each other, it is easy to set the shape and the thickness of the race 3. It is therefore possible to enhance degrees of freedom in shape and thickness.

With such an arrangement of the present invention, it is possible to play the following effect. In the stud provided with the spherical surface bearing, the race is composed of two members, in which each member has the coupling surface which couples with the other, and each coupling surface has a screw portion, respectively, therefore, upon manufacturing the stud, the ball of the stud may be clamped by the ball receiving portion, of which each member is formed independently, and the two members may be fixed to each other by the screw portions formed on the coupling surfaces of the rspective members. In this case, by adjusting the amount of the engagement at the screw portions, it makes possible to be set the position between each member at will. Also, it is possible to set the gap between the ball receiving portion of the race and the ball as desired. Namely, the adjustment of the gap between the ball receiving portion of the race and the ball, which has been difficult to attain, may readily be effected only by adjusting the amount of the engagement at the screw portions of the constituent parts of the race. Accordingly, it is unnecessary to depend largely on a skill or experience of the worker, and it is possible to remarkably reduce the manufacturing cost.

Also, the adjustment of the gap between the ball receiving portion of the race and the ball is carried out only by the adjustment of the amount of the engagement at the screw portions. This does not depend upon such method as to bring the race into pressing contact with the surface of the ball to transfer its spherical shape as in conventional case. This makes it possible to set the shape and the thickness of the race as desired. It is therefore possible to expand a field of application of the stud provided with the spherical surface bearing.

Furthermore, in the stud having the spherical surface bearing, the fixing means for fixing the positional relationship between the coupling surfaces is used to thereby position the two members constituting the race, i.e., without an occurrence of any change at the gap between the ball and the ball receiving portion. Also, the respective members formed by dividing a single member are firmly fixed as a single race to make it possible to prevent disconnecting with each other. It is therefore possible to enhance the reliability of the products.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A stud composed of a rod, a race and a ball provided in a proximal end of the rod being held by the race comprising:
    a first member and a second member which make a threaded connection with each other in an axial direction of the rod to form the race for supporting the ball; and locking means for locking connecting surfaces of the first and second members so as to allow the ball to pivot.

2. The stud according to claim 1, wherein said locking means is a screw.

3. The stud according to claim 1, wherein said locking means is a pin.

4. The stud according to claim 1, wherein said locking means is an adhesive.

* * * * *